United States Patent Office 3,030,070
Patented Apr. 17, 1962.

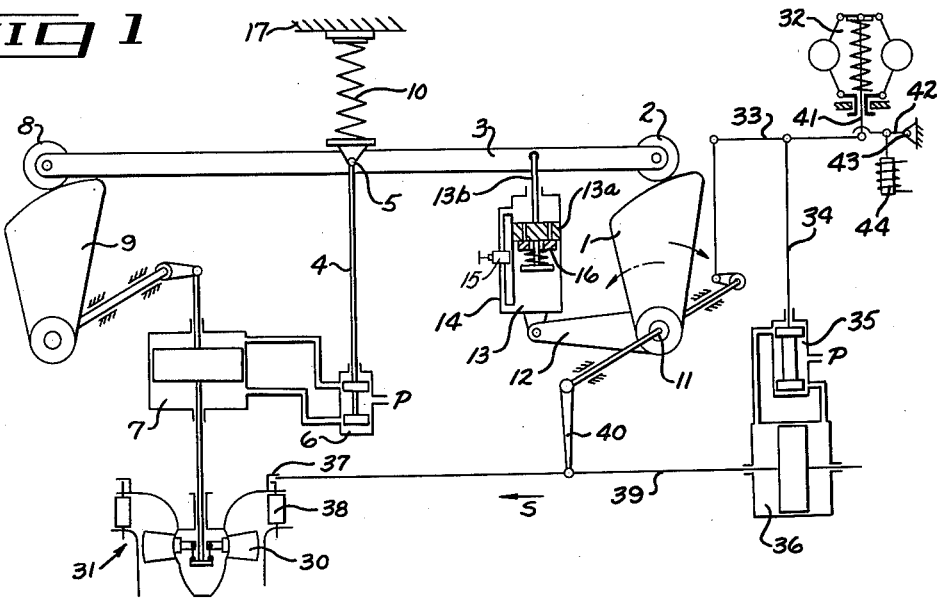

3,030,070
CONTROL SYSTEM FOR FLUID FLOW MACHINES ESPECIALLY KAPLAN TURBINES
Hans Krauss, Heidenheim (Brenz), Germany, assignor to J. M. Voith G.m.b.H., Heidenheim (Brenz), Germany
Filed Mar. 19, 1958, Ser. No. 722,567
Claims priority, application Germany Mar. 21, 1957
4 Claims. (Cl. 253—31)

The present invention relates to a control system for fluid flow machines, especially Kaplan turbines, and, more particularly, concerns an arrangement for limiting the increase in the speed of rotation of such machines when the load on such machines suddenly drops.

With fluid flow machines, especially Kaplan turbines, having adjustable guide wheel and runner wheel blades and being coupled to an electric generator, it is a well known fact that in case the load on the turbine suddenly drops, for instance if the network fed by the generator is shut off for some reason, steps will immediately be necessary to prevent the turbine from racing. To this end, it would for instance theoretically be possible to provide means which will bring about that the guiding apparatus will close in a still shorter time than the normally shortest possible closing time. However, inasmuch as the normally shortest possible closing time of the guiding apparatus is already so short that the pressure shocks dangerous for the pressure water feeding lines will just be avoided, a further shortening of the closing time of the guiding apparatus would necessarily produce the said mentioned pressure shocks. Therefore, a further shortening of the closing time of the guiding apparatus is not possible in practice.

In an effort to limit the undesired increase in the speed of the turbine in case of a sudden and usually unforeseen drop in the load of the turbine, while simultaneously aiming at avoiding the above mentioned dangerous pressure shocks, it has been suggested to provide the turbine with additional flywheel masses, for instance a flywheel. However, this solution has likewise proved unsatisfactory in practice. If the speed increase, as customary, should not exceed 30 to 40% of the speed of the turbine under full load, a considerable amount of flywheel masses is required which increases with increasing turbine output and also with reducing speed of the turbine. In order to avoid the installation of too large flywheel masses, it has been suggested to drop the customary guaranties for the maintenance of certain speeds. This, however, is possible only if after a sudden drop in the load of the turbine, the generator does not have to feed current consumers, especially no electrically driven centrifugal pumps because the latter would be considerably damaged in view of the increase in the voltage and frequency inherent to the speed increase of the turbine and therefore of the generator.

If, however, the generator of a Kaplan turbine has to feed a plurality of networks at rather high output and low normal speed, for instance a large network and in addition thereto one or more small networks with relatively low load, and if the large network is to be shut off suddenly, for instance in view of a short circuit, it would be necessary in order to be able to limit the speed increase, to provide rather large flywheel masses.

In order to avoid this drawback, it has been suggested to make use of a certain property of Kaplan turbines in conformity with the so-called swell control for Kaplan turbine installations in navigable rivers or canals which, as is well known, have to meet the requirement that also at a sudden drop in the load of the turbine the latter has to be operated in such a way that the water level must be kept substantially constant in order to avoid endangering navigation. The certain property of Kaplan turbines mentioned above consists in that of a sudden drop in the load on the turbine, the respective water flow through the turbine may be kept unchanged if while retaining the respective guide wheel blade position, the runner blades are opened correspondingly. More specifically, with this known device, use was made of the said property of the Kaplan turbine in such a way that if at points of operation of the turbine which correspond to a guide wheel opening of more than 50%, a complete relief of the turbine is effected, in other words the generator is completely taken out of the network, an auxiliary contact at the generator switch actuates a device which prevents a closing of the guide wheel in excess of 50% guide wheel opening while simultaneously the runner is moved into completely open position. While such an arrangement accomplishes its purpose proper, namely to assure a substantial constant level of the river water, this known solution does by no means safely and appropriately limit the turbine speed increase within permissible limits nor does it prevent undesired high racing speeds of the turbine. Aside from the fact that the said known arrangement responds only in certain instances and in such instances always by completely putting the turbine out of operation, and aside from the fact that manual switch operations have to be carried out in such circumstances, it also brings about a drop in the degree of efficiency of the turbine which alone counteracts somewhat the increase in the speed, but only in a very insufficient manner.

It is therefore an object of the present invention to provide an improved control mechanism for use in connection with fluid flow machines with adjustable guide wheel and runner blades, especially Kaplan turbines, by which, upon a sudden increase of turbine speed, the runner blades are moved in their opening direction while simultaneously the guide wheel blades move in their closing direction within the time limit set to prevent water hammer, whereby the normal correlation between the runner blades and the guide blades is interrupted, and then, subsequently, the runner blades are slowly moved back toward their closed position until the runner blades are again correlated.

It is a still further object of this invention to provide an arrangement of the type set forth in the preceding paragraphs, which is relatively simple in construction and relatively inexpensive.

These and other objects and advantages of the invention will appear more clearly from the following specification in connection with the accompanying drawing, in which:

FIG. 1 diagrammatically illustrates a device according to the present invention.

FIG. 2 is a modification of the arrangement of FIG. 1 inasmuch as it employs two servomotors.

GENERAL ARRANGEMENT

According to the present invention, it has been found that a particularly advantageous and effective limitation in the speed increase can be obtained and thereby a racing of the machine can be safely prevented if, at a sudden decrease in the load, which alone can bring about the undesired high speeds, in addition to the closing movement of the guide wheel, first the ordinary coordination or relationship between guide wheel blade and runner blade position will be interrupted and the runner blades will be opened in conformity with the said position, whereupon the runner blades are slowly closed until eventually at a corresponding relationship between guide wheel blade and runner blade opening in conformity with the changed load, the normal relationship or coordination between guide wheel and runner wheel position has been reestablished. This arrangement will be effective regardless of the respective point of operation of the machine and regardless of whether the load on the turbine drops completely or only partially.

In this connection it should be borne in mind that an opening of the runner blades simultaneously with the closing of the guide wheel blades and substantially proportional thereto will bring about that the runner and guide wheel will in the shortest possible time establish such a coordination or relationship that in case of a complete drop of the load on the turbine, a relatively low racing speed will occur. Since, however, such coordination or relationship will always be established in conformity with the degree of efficiency of the machine, it will be evident that within the shortest possible time, a maximum possible drop in the degree of efficiency will occur. Such drop, however, will in a most favorable manner act counter to a sudden drop in the load of the machine and counter to the undesired speed increase inherent thereto, while at the same time limiting the said speed increase to such an extent that it will remain within permissible limits. In addition thereto, the excess speed will in a considerably shorter time drop back to the normal speed than was possible with heretofore known devices.

Therefore, according to the present invention, a new method and arrangement is suggested for limiting the speed increase at a sudden drop in the load of the respective fluid flow machines, especially Kaplan turbines, with which the coordination or relationship between guide wheel blade and runner blade adjustment at normal operation is effected by means of a cam disc connected for instance with the guide wheel adjusting means operable by the speed governor, said runner blade adjusting means being held in operative connection with said cam disc for instance by a spring. According to the said new method and device of the present invention, at each fast adjusting movement of the cam disc inherent to a sudden decrease in the load on the turbine and effected in the direction of a guide wheel blade closing movement, a hydraulic adjusting movement is provided between said cam disc and the runner blade adjusting means, which is actuated by the cam disc and first interrupts the normal coordination and relationship between guide wheel blade and runner blade adjustment by temporarily interrupting the operative connection between the cam disc and the runner blade adjusting means, while the runner blade adjusting means are adjusted against the thrust of a spring in closing direction of the guide wheel blades approximately proportional to the opening movement of the runner blades. Thereupon, the runner blade adjusting means are due to the thrust of said spring and under the delaying influence of the hydraulic adjusting means adjusted with a delay in the direction of the runner blade closing movement until the operative connection between the runner blade adjusting means and the cam disc has been reestablished and the normal interdependence or coordination between guide wheel and runner blade adjustment has been reestablished in conformity with the changed load.

According to a further suggestion of the present invention, an arrangement for carrying out the above process is provided according to which the hydraulic adjusting means is designed as a servomotor. The cylinder or piston thereof is connected to the shaft of said cam disc while the piston or cylinder is connected to the runner blade adjusting means. The cylinder chambers on both sides of the piston are adapted to communicate with each other through a check valve and a bypass passage with an adjustable orifice. The design of the hydraulic adjusting means as a servomotor is particularly favorable because such a structure is rather simple and very reliable in operation and does not require any special servicing.

However, the hydraulic adjusting means may also consist of two servomotors. In this instance, the piston of one servomotor will be connected to the cam disc, and the piston of the other servomotor will be connected to the runner blade adjusting means, for instance to the adjusting link system for the runner control valve. The working chambers of the two servomotors will be connected to each other through conduit means which through an adjustable orifices are connected to an oil reservoir common to said two servomotors.

STRUCTURAL ARRANGEMENT

Embodiment of FIG. 1

Referring now to the drawing in detail, the control mechanism shown therein comprises a cam disc 1 adapted to be controlled by a speed governor 32. The speed governor 32 is connected to cam 1 by means of a lever 33 to which is attached a piston rod 34 pertaining to a guide blade control valve 35. The movements of the governor 32 are transmitted by the control valve 35 to the gate servomotor 36 which correspondingly adjusts the guide rim 37 of the guide blades 38. It will be seen that the lever 40 and thus the shaft 11 with cam disk 1 will be moved in conformity with the movement of the piston rod 39 of the servomotor 36. The cam disk is cooperating with a roller 2 for controlling the adjustment of the runner blades 30 of a fluid flow machine 31 as for instance a Kaplan turbine. Roller 2 is rotatably supported by one end of a tiltable arm or adjusting rod 3 and is adapted to roll on the cam 1. Rod 3 is connected with a ocntrol valve 6 for a runner servomotor 7 through the intervention of a rod 4 pivotally connected at 5 to the adjusting rod 3. The other end of the adjusting rod 3 supports a rotatably journalled roller 8 adapted to roll on a cam 9. Cam 9 serves for returning the tiltable arm or rod 3 and thereby the control valve 6 for the roller 2 to the starting position thereof, i.e. its intermediate position. The tiltable arm 3 and the two rollers 2 and 8 are pressed against the cam surface of the cams 1 and 9 respectively by means of a spring 10 having one and resting against a stationary member while the other end rests against arm 3 or an element connected thereto.

Connected to shaft 11 of cam 1 is a lever 12 which is linked to the cylinder bottom of a servomotor 13, the piston 13a of servomotor 13 has its piston rod 13b pivotally connected to the tiltable arm 3. The servomotor cylinder has a bypass passage 14 with an adjustable orifice 15. Furthermore, the piston 13a is provided with a check valve 16. The purpose of check valve 16 consists in preventing the flow of fluid such as oil from flowing from the lower cylinder chamber through the piston into the upper cylinder chamber when the cam 1 carries out closing movements in the direction of the solid arrow shown in FIG. 1. On the other hand, the check valve 16 allows passage of the fluid through the piston when the cam carries out its opening movements in the direction of the dot-dash line arrow of FIG. 1.

The orifice 15 of the bypass passage is so adjusted that at normal mostly rather slow and relatively small closing movements of the cam, the displaced oil will be able to flow through the bypass passage from one cylinder chamber into the other without conveying the adjusting movement to the piston rod 13b.

Thus, normally, no lifting off of the roller 2 from the surface of cam 1 will occur. Only when a quick closure movement of the cam is brought about by the governor, in other words at fast closing movements of the cam, will roller 2 lift off cam 1. During such rapid movement of the cam, the bypass passage 14 is inadequate for conveying fluid at a rapid enough rate to permit the roller 2 to follow the cam surface cooperating therewith and the roller 2 therefore separates from the cam surface.

Furthermore, connected to governor 32 and, more specifically, to the governor shaft 41 is a lever 42 which is supported at 43 and is connected with the quick-closing member 44. The quick-closing member 44 is a magnetic coil which is energized when one of the safety devices provided in the turbine plant responds and moves the lever 42 and thus also member 41 downwardly thereby bringing about a quick closure of the guide blades and opening of the runner blades.

OPERATION OF ARRANGEMENT OF FIG. 1

If, for instance, due to a short circuit in a network fed by the turbine generator, a sudden closing movement of the turbine governor 32 has been brought about, the guide wheel blades will be adjusted in closing direction through the intervention of rods 41 and 33, piston rod 34, control valve 35, servomotor 36, piston rod 39 and guide rim 37. At the same time, due to the adjusting movement of the piston rod 39 which adjusting movement occurs during said closing movement of the turbine governor 32, cam disc 1 and lever 12 will be quickly tilted in the direction indicated by the arrow A whereby the cylinder of servomotor 13 will be raised by lever 12. The tilting movement of cam disc 1 and lever 12 will, in this connection, be brought about by lever 40 linked to piston rod 39 and by shaft 11 to which cam disc 1 is connected. Due to the unilaterally effective check valve 16 of the servomotor piston and of the bypass passage 14 which in this instance nearly blocks the passage of oil from the lower to the upper cylinder, also piston 13a is carried along, i.e. is lifted, and the tilting arm 3 is lifted against the thrust of spring 10. As a result thereof, the runner control valve 6 is displaced by rod 4 into its opening position, which means that the runner blades are opened about proportionally to the closing movements of cam 1 while the actual power connection between said cams and the runner control is at least temporarily interrupted and, consequently, a racing of the turbine is not possible any longer.

A return of the roller 2, initiated by the pressure spring 10, to its cam 1 can, however, be carried out with a delay only. This is due to the fact that with the simultaneous downward movement of the servomotor piston 13a, which is connected to the tiltable arm 3, the oil displaced by the servomotor piston 13a can pass through the orifice 15 only of the bypass passage 14, which means that it can flow only with a time delay. However, before the roller 2 again engages the cam surface of cam 1, the coordination between guide wheel blade and runner blade adjustment in conformity with the new condition of operation has been adjusted gradually and consequently without harmful reactions upon the pressure water line.

The above operations take place in the same way, if the quick-closing member 44 becomes effective.

*Embodiment of FIG. 2*

According to the arrangement shown in FIG. 2, two servomotors 18 and 19 are employed. In this arrangement, the piston rod 18a of servomotor 18 is pivotally connected with lever 12a of cam 1, while the piston rod 19a of servomotor 19 is pivotally connected with the tiltable arm or rod 3. The cylinders of the two servomotors 18 and 19 communicate with each other through a conduit 20. Conduit 20 has a branch line 20a which through an adjustable orifice 21 leads into an oil reservoir 22 common to said two servomotors 18 and 19.

If the turbine governor or the quick closing member brings about a quick closing movement of cam 1 in the direction of the solid arrow similar to the manner described in FIG. 1, the piston of servomotor 18 is moved downwardly as a result of which the oil is pumped through conduit 20 into the second servomotor 19 while the passage of oil through branch conduit 20a and orifice 21 into reservoir 22 is throttled to such an extent that it cannot affect the transfer movements. Piston 19b will be lifted approximately proportionally to the closing movement of cam 1a so that the power connection between roller 2 and the cam surface of cam 1 is temporarily interrupted. The lifting movement of the tiltable arm 3 simultaneously through rod 4 coupled to arm 3 brings about an adjustment of the valve 6 for runner servomotor 7 in an opening direction. The delayed return of the tiltable arm 3 is in conformity with this arrangement carried out in such a way that the oil due to spring 10 acting through arm 3a upon the piston rod 19a is pumped back through conduit 20 and branch 20a as well as orifice 21 into the reservoir 22. This pumping back action, however, is carried out only slowly and only until the roller 2 again engages the cam surface of cam 1. In the meantime, however, the governor has adjusted the cam for a new position.

When cam 1 carries out opening movements, in other words when the pistons of the two servomotors 18 and 19 move upwardly, valve 23, which is effective unilaterally only, will withdraw oil from the reservoir 22 thereby preventing the formation of a vacuum in the cylinders and in conduit 20.

It is, of course, to be understood that the present invention is, by no means, limited to the particular construction shown in the drawing but also comprises any modifications within the scope of the appended claims.

What I claim is:

1. In a method of limiting the speed increase of a fluid flow machine, especially a Kaplan turbine, during a sudden decrease in the load on said fluid flow machine, in which during normal operation the interdependent relationship between guide wheel blades and runner vanes of the turbine is established in conformity with the speed changes of a speed governor, the steps of: at a sudden decrease in the load of the turbine opening the runner vanes substantially proportional to a simultaneous closing of the guide wheel blades, and subsequently closing the runner vanes at delayed action until a relationship between guide wheel blades and runner vanes has been established which corresponds to a new condition of equilibrium in conformity with the changed load on the turbine.

2. In combination: a fluid flow machine, especially a Kaplan turbine, said machine having adjustable guide wheel blades controlling the flow of pressure fluid through said machine and also having a runner, said runner having adjustable runner vanes, and a control system comprising first adjusting means operatively connected to said runner vanes for adjusting the same in opening and closing direction, second adjusting means operatively connected to said guide wheel blades for adjusting the same in closing and opening direction, speed responsive means movable in conformity with changes in the speed of said fluid flow machine, said speed responsive means including a member having a control surface, first control means continuously operatively connected to said speed responsive means and said second adjusting means for controlling the latter in conformity with the respective position of said speed responsive means, second control means operatively connected to said first adjusting means and normally engaging said control surface, a valve continuously operatively connected to said second control means for adjustment thereby and hydraulically connected to said first adjusting means for controlling the latter in conformity with the respective position of said second control means, fluid operable means having a first member connected to said second control means and having a second member connected to the member with said control surface, said fluid operable means being operable in response to a certain adjustment of said speed responsive means in a closing direction of said guide wheel blades due to a sudden decrease in the speed of said fluid flow machine to lift said second control means off said control surface whereby the adjusting relationship between guide wheel blades and runner vanes is temporarily interrupted and said runner vanes are adjusted in opening direction, said fluid operable means including means for enabling re-engagement of said second control means with said control surface at a speed reduced with respect to the speed of said lifting-off movement, and means continuously urging said second control means into engagement with said control surface whereby said runner blades are gradually moved in closing direction until said second control means again engages said control surface in conformity with the newly established equilibrium of operation corresponding to the changed load on the turbine.

3. An arrangement according to claim 2, in which said fluid operable means comprises a first element in the form of a piston and also comprises a second element in the form of a cylinder, one of said two elements being operatively connected to said member with said control surface and the other element being operatively connected to said second control means, passage means for effecting communication between opposite sides of said piston, and a bypass passage having an adjustable orifice therein arranged in said passage means.

4. An arrangement according to claim 2, in which said fluid operable means comprises two servomotors each including a cylinder and a piston, the piston of one of said servomotors being operatively connected to said member with said control surface and the piston of the other servomotor being operatively connected to said second control means, a fluid reservoir common to said two servomotors, conduit means for effecting communication between the working chambers of said two servomotors and communicating with said reservoir, and adjustable fluid flow restricting means arranged in said conduit means.

References Cited in the file of this patent

UNITED STATES PATENTS

| | | |
|---|---|---|
| 2,283,127 | Rheingans | May 12, 1942 |
| 2,310,994 | Ring et al. | Feb. 16, 1943 |
| 2,840,344 | Stage | June 24, 1958 |